US009600486B2

(12) United States Patent
Mason et al.

(10) Patent No.: US 9,600,486 B2
(45) Date of Patent: *Mar. 21, 2017

(54) FILE SYSTEM DIRECTORY ATTRIBUTE CORRECTION

(71) Applicant: OSR Open Systems Resources, Inc., Amherst, NH (US)

(72) Inventors: W. Anthony Mason, Vancouver (CA); Scott J. Noone, Nashua, NH (US); Roderick David Wolfe Widdowson, East Lothian (GB)

(73) Assignee: OSR Open Systems Resources, Inc., Amherst, NH (US)

( * ) Notice: Subject to any disclaimer, the term of this patent is extended or adjusted under 35 U.S.C. 154(b) by 161 days.

This patent is subject to a terminal disclaimer.

(21) Appl. No.: 14/557,130

(22) Filed: Dec. 1, 2014

(65) Prior Publication Data
US 2015/0113011 A1 Apr. 23, 2015

Related U.S. Application Data

(63) Continuation of application No. 13/668,033, filed on Nov. 2, 2012, now Pat. No. 8,903,874.

(60) Provisional application No. 61/555,419, filed on Nov. 3, 2011.

(51) Int. Cl.
*G06F 17/30* (2006.01)
(52) U.S. Cl.
CPC .. *G06F 17/30076* (2013.01); *G06F 17/30091* (2013.01); *G06F 17/30115* (2013.01)
(58) Field of Classification Search
None
See application file for complete search history.

(56) References Cited

U.S. PATENT DOCUMENTS

| 4,135,240 A | 1/1979 | Ritchie |
| 4,959,811 A | 9/1990 | Szczepanek |
| 4,984,153 A | 1/1991 | Kregness et al. |
| 5,027,395 A | 6/1991 | Anderson et al. |

(Continued)

FOREIGN PATENT DOCUMENTS

| EP | 1320010 A2 | 6/2003 |
| GB | 2435945 B | 10/2008 |

(Continued)

OTHER PUBLICATIONS

Burrows et al., "On-line Data Compression in a Log-structured File System," proceedings of the Fifth International Conference on Architectural Support for Programming Languages and Operating Systems, Oct. 12-15, 1992, ACM Press, pp. 1-21.

(Continued)

*Primary Examiner* — Alex Gofman
*Assistant Examiner* — Umar Mian
(74) *Attorney, Agent, or Firm* — Schwegman Lundberg & Woessner, P.A.

(57) ABSTRACT

Various embodiments are directed to systems and methods for facilitating file attribute correction. A computer system may receive a request to enumerate a first directory stored on a data storage. For a first file in the first directory, the computer system may determine that the first file has a corresponding first entry in an attribute cache, determine that the first entry for the first file indicates native file attributes that match the first file, and return for the first file at least one logical attribute indicated by the first entry.

22 Claims, 8 Drawing Sheets

(56) References Cited

U.S. PATENT DOCUMENTS

| | | |
|---|---|---|
| 5,488,701 A | 1/1996 | Brady et al. |
| 5,506,983 A | 4/1996 | Atkinson et al. |
| 5,530,850 A | 6/1996 | Ford et al. |
| 5,537,588 A | 7/1996 | Engelmann et al. |
| 5,551,003 A | 8/1996 | Mattson et al. |
| 5,560,008 A | 9/1996 | Johnson et al. |
| 5,561,799 A | 10/1996 | Khalidi et al. |
| 5,574,898 A | 11/1996 | Leblang et al. |
| 5,606,983 A | 3/1997 | Monty et al. |
| 5,652,879 A | 7/1997 | Harris et al. |
| 5,664,178 A | 9/1997 | Sinofsky |
| 5,706,504 A | 1/1998 | Atkinson et al. |
| 5,715,441 A | 2/1998 | Atkinson et al. |
| 5,734,861 A | 3/1998 | Cohn et al. |
| 5,752,252 A | 5/1998 | Zbikowski et al. |
| 5,757,915 A | 5/1998 | Aucsmith et al. |
| 5,764,880 A | 6/1998 | Gerdt et al. |
| 5,781,797 A | 7/1998 | Crick et al. |
| 5,799,324 A | 8/1998 | McNutt et al. |
| 5,802,344 A | 9/1998 | Menon et al. |
| 5,815,707 A | 9/1998 | Krause et al. |
| 5,832,515 A | 11/1998 | Ledain et al. |
| 5,857,207 A | 1/1999 | Lo et al. |
| 5,873,097 A | 2/1999 | Harris et al. |
| 5,923,878 A | 7/1999 | Marsland |
| 5,991,893 A | 11/1999 | Snider |
| 5,996,054 A | 11/1999 | Ledain et al. |
| 6,006,227 A | 12/1999 | Freeman et al. |
| 6,021,408 A | 2/2000 | Ledain et al. |
| 6,021,509 A | 2/2000 | Gerdt et al. |
| 6,038,668 A | 3/2000 | Chipman et al. |
| 6,065,100 A | 5/2000 | Schafer et al. |
| 6,079,047 A | 6/2000 | Cotugno et al. |
| 6,101,186 A | 8/2000 | Craig |
| 6,108,420 A | 8/2000 | Larose et al. |
| 6,128,630 A | 10/2000 | Shackelford |
| 6,148,368 A | 11/2000 | DeKoning |
| 6,240,527 B1 | 5/2001 | Schneider |
| 6,260,036 B1 | 7/2001 | Almasi et al. |
| 6,321,239 B1 | 11/2001 | Shackelford |
| 6,336,164 B1 | 1/2002 | Gerdt et al. |
| 6,347,397 B1 | 2/2002 | Curtis |
| 6,366,987 B1 | 4/2002 | Tzelnic et al. |
| 6,367,008 B1 | 4/2002 | Rollins |
| 6,377,958 B1 | 4/2002 | Orcutt |
| 6,381,682 B2 | 4/2002 | Noel et al. |
| 6,418,509 B1 | 7/2002 | Yanai et al. |
| 6,430,548 B1 | 8/2002 | Deis et al. |
| 6,438,594 B1 | 8/2002 | Bowman-Amuah |
| 6,449,688 B1 | 9/2002 | Peters et al. |
| 6,490,664 B1 | 12/2002 | Jones et al. |
| 6,526,570 B1 | 2/2003 | Click, Jr. et al. |
| 6,529,909 B1 | 3/2003 | Bowman-Amuah |
| 6,535,949 B1 | 3/2003 | Parker |
| 6,577,254 B2 | 6/2003 | Rasmussen |
| 6,597,812 B1 | 7/2003 | Fallon et al. |
| 6,601,104 B1 | 7/2003 | Fallon |
| 6,604,158 B1 | 8/2003 | Fallon |
| 6,624,761 B2 | 9/2003 | Fallon |
| 6,625,671 B1 | 9/2003 | Collette et al. |
| 6,628,411 B2 | 9/2003 | Miller et al. |
| 6,633,244 B2 | 10/2003 | Avery et al. |
| 6,633,883 B2 | 10/2003 | Koskas |
| 6,643,405 B1 | 11/2003 | Sako |
| 6,643,652 B2 | 11/2003 | Helgeson et al. |
| 6,654,851 B1 | 11/2003 | McKean |
| 6,657,565 B2 | 12/2003 | Kampf |
| 6,664,903 B2 | 12/2003 | Kugai |
| 6,667,700 B1 | 12/2003 | McCanne et al. |
| 6,704,839 B2 | 3/2004 | Butterworth et al. |
| 6,711,709 B1 | 3/2004 | York |
| 6,732,125 B1 | 5/2004 | Autrey et al. |
| 6,738,863 B2 | 5/2004 | Butterworth et al. |
| 6,741,747 B1 | 5/2004 | Burns et al. |
| 6,742,028 B1 | 5/2004 | Wang et al. |
| 6,775,781 B1 | 8/2004 | Phillips et al. |
| 6,782,319 B1 | 8/2004 | McDonough |
| 6,785,768 B2 | 8/2004 | Peters et al. |
| 6,795,640 B1 | 9/2004 | Honda |
| 6,795,897 B2 | 9/2004 | Benveniste et al. |
| 6,804,718 B1 | 10/2004 | Pang et al. |
| 6,847,681 B2 | 1/2005 | Saunders et al. |
| 6,856,993 B1 | 2/2005 | Verma et al. |
| 6,901,403 B1 | 5/2005 | Bata et al. |
| 6,915,339 B2 | 7/2005 | Hartman et al. |
| 6,925,533 B2 | 8/2005 | Lewis |
| 6,944,619 B2 | 9/2005 | Gruenwald |
| 6,947,556 B1 | 9/2005 | Matyas, Jr. et al. |
| 6,983,456 B2 | 1/2006 | Poznanovic et al. |
| 7,051,031 B2 | 5/2006 | Schein |
| 7,085,766 B2 | 8/2006 | Keith, Jr. |
| 7,088,823 B2 | 8/2006 | Fetkovich |
| 7,100,047 B2 | 8/2006 | Stamos et al. |
| 7,107,267 B2 | 9/2006 | Taylor |
| 7,146,009 B2 | 12/2006 | Andivahis et al. |
| 7,191,189 B2 | 3/2007 | Bhatti |
| 7,225,333 B2 | 5/2007 | Peinado et al. |
| 7,240,151 B1 | 7/2007 | Todd et al. |
| 7,260,576 B2 | 8/2007 | Pasupathy et al. |
| 7,272,687 B2 | 9/2007 | Balasubramanian |
| 7,340,581 B2 | 3/2008 | Gorobets et al. |
| 7,370,319 B2 | 5/2008 | Pensak et al. |
| 7,373,362 B2 | 5/2008 | Detweiler et al. |
| 7,392,383 B2 | 6/2008 | Basibes et al. |
| 7,409,470 B2 | 8/2008 | Halstead et al. |
| 7,418,588 B2 | 8/2008 | Lin et al. |
| 7,428,547 B2 | 9/2008 | Basso et al. |
| 7,444,625 B2 | 10/2008 | Anwar et al. |
| 7,454,411 B2 | 11/2008 | Birdwell et al. |
| 7,487,363 B2 | 2/2009 | Alve et al. |
| 7,502,713 B2 | 3/2009 | Hillier et al. |
| 7,512,748 B1 | 3/2009 | Mason et al. |
| 7,523,221 B2 | 4/2009 | Hillberg |
| 7,530,016 B2 | 5/2009 | Sahota et al. |
| 7,536,418 B2 | 5/2009 | Buchsbaum et al. |
| 7,546,221 B2 | 6/2009 | Moon et al. |
| 7,546,335 B2 | 6/2009 | Moeller et al. |
| 7,549,174 B1 | 6/2009 | Falkner et al. |
| 7,647,355 B2 | 1/2010 | Best et al. |
| 7,702,995 B2 | 4/2010 | Sahota et al. |
| 7,783,765 B2 | 8/2010 | Hildebrand et al. |
| 7,802,082 B2 | 9/2010 | Kruse et al. |
| 7,805,755 B2 | 9/2010 | Brown et al. |
| 7,809,897 B1 | 10/2010 | Mason et al. |
| 7,823,210 B2 | 10/2010 | Bessonov et al. |
| 7,930,756 B1 | 4/2011 | Crocker et al. |
| 7,949,693 B1 | 5/2011 | Manson et al. |
| 8,024,433 B2 | 9/2011 | Mason et al. |
| 8,266,114 B2 | 9/2012 | Mace et al. |
| 8,442,236 B2 | 5/2013 | De Petris et al. |
| 8,521,752 B2 | 8/2013 | Mason et al. |
| 8,539,228 B1 | 9/2013 | Mason et al. |
| 8,903,874 B2 | 12/2014 | Mason et al. |
| 8,990,228 B2 | 3/2015 | Mason et al. |
| 2002/0052868 A1 | 5/2002 | Mohindra et al. |
| 2002/0073066 A1 | 6/2002 | Coutts et al. |
| 2002/0143735 A1 | 10/2002 | Ayi et al. |
| 2003/0110478 A1 | 6/2003 | Duesterwald et al. |
| 2003/0123446 A1 | 7/2003 | Muirhead et al. |
| 2004/0015958 A1 | 1/2004 | Veil et al. |
| 2004/0250247 A1 | 12/2004 | Deeths et al. |
| 2005/0144189 A1 | 6/2005 | Edwards et al. |
| 2005/0240966 A1 | 10/2005 | Hindle et al. |
| 2006/0031246 A1 | 2/2006 | Grayson |
| 2006/0069702 A1 | 3/2006 | Moeller et al. |
| 2006/0070076 A1 | 3/2006 | Ma |
| 2006/0101025 A1 | 5/2006 | Tichy et al. |
| 2006/0123250 A1 | 6/2006 | Maheshwari et al. |
| 2006/0190417 A1 | 8/2006 | Hilkemeyer et al. |
| 2006/0195476 A1 | 8/2006 | Nori et al. |
| 2008/0134154 A1 | 6/2008 | Patel et al. |
| 2009/0249277 A1 | 10/2009 | Prakash |
| 2010/0094806 A1 | 4/2010 | Apostolides et al. |
| 2010/0211616 A1 | 8/2010 | Khandelwal et al. |

(56) References Cited

U.S. PATENT DOCUMENTS

| | | | |
|---|---|---|---|
| 2010/0217948 | A1 | 8/2010 | Mason et al. |
| 2013/0046846 | A1 | 2/2013 | Mason et al. |
| 2013/0311493 | A1 | 11/2013 | Mason et al. |

FOREIGN PATENT DOCUMENTS

| | | |
|---|---|---|
| WO | WO 2006/081508 A1 | 8/2006 |
| WO | WO 2011/085101 A1 | 7/2011 |

OTHER PUBLICATIONS

Rosenblum, Mendel and Ousterhout, John K., "The Design and Implementation of a Log-Structured File System," ACM Transactions on Computer Systems, vol. 10, No. 1, Feb. 1992; pp. 26-52.
"Sponsor Sessions," http://microsoft.com/whdc/driverdevcon/ddctracks2005/d05_sponsors.mspx, updated Mar. 25, 2005, printed Apr. 25, 2006, 2 pages.
"Windows Driver Devcon 2005; Practical Challenges in Implementing Encryption/Compression Filters," Microsoft Windows Hardware & Driver Central, Microsoft Corporation, 2005, 21 pages.
Mac OS X ABI Mach-O File Format Reference, Oct. 3, 2006, 62 pages.
"Windows Streams—An Introduction to File System Streams," printed from http://www.osronline.com, The NT Insider, vol. 13, Issue 2, Mar.-Apr. 2006, Apr. 17, 2006, 6 pages.
Duncan, Geoff, "Man Buys Used iPod with U.S. Troop Data", Jan. 27, 2009, printed from http://digitaltrends.com/international/man-buys-used-ipod-with-us-troop-data/ (1 page).
Bressoud, Thomas C. et al., "OpenCAS: A Flexible Architecture for Content Addressable Storage", Proceedings of the ISCA 17$^{th}$ International Conference, Parallel and Distributed Computing Systems, San Francisco, California, Sep. 15-17, 2004, pp. 580-587.
Sun, Hongwei, "Client caching features: Oplock vs. Lease," May 22, 2009, downloaded from http://blogs.msdn.com/b/openspecification/archive/2009/05/22/client-caching-features-oplock-vs-lease.aspx on Jan. 15, 2014.
Heinrich, Mark Andrew, "The Performance and Scalability of Distributed Shared Memory Cache Coherence Protocols," Chapter 2, Cache Coherence Protocols, Ph.D. Dissertation, Computer Systems Laboratory, Stanford University, Oct. 1998, downloaded from http://www.csl.cornell.edu/~heinrich/dissertation/ on Jan. 15, 2014.
Mason, W. Anthony, "Locks," seminar slides presented in 2008, OSR Open Systems Resources, Inc., 10 pages.
Office Action (Interview Summary) issued on May 23, 2008 in U.S. Appl. No. 11/145,433.
Office Action (Interview Summary) issued on Nov. 14, 2007 in U.S. Appl. No. 11/145,433.
Office Action issued on Feb. 23, 2009 in U.S. Appl. No. 11/145,433.
Office Action issued on Jul. 20, 2007 in U.S. Appl. No. 11/145,433.
Office Action issued on Mar. 19, 2008 in U.S. Appl. No. 11/145,433.
Office Action issued on Sep. 16, 2008 in U.S. Appl. No. 11/145,433.
Office Action issued on Aug. 3, 2009 in U.S. Appl. No. 11/145,433.
Response to Nov. 14, 2007 Office Action (Interview Summary) filed Dec. 4, 2007 in U.S. Appl. No. 11/145,433.
Office Action (Interview Summary) issued on Feb. 1, 2010 in U.S. Appl. No. 11/145,433.
Examiner's Answer issued on Jul. 7, 2010 in U.S. Appl. No. 11/145,433.
Office Action (Interview Summary) issued on Apr. 8, 2009 in U.S. Appl. No. 11/145,433.
Decision on Appeal issued on Jan. 29, 2013 in U.S. Appl. No. 11/145,433.
Oral Hearing Held Jan. 17, 2013 issued on Feb. 20, 2013 in U.S. Appl. No. 11/145,433.
Notice of Allowance and Examiner-Initiated Interview Summary issued on Jun. 19, 2013 in U.S. Appl. No. 11/145,433.
Corrected Notice of Allowability issued on Jul. 24, 2013 in U.S. Appl. No. 11/145,433.
Office Action issued on Dec. 8, 2009 in U.S. Appl. No. 11/509,391.
Office Action issued on Jul. 12, 2010 in U.S. Appl. No. 11/509,391.
Office Action issued on Feb. 23, 2011 in U.S. Appl. No. 11/509,391.
Office Action issued on Aug. 26, 2011 in U.S. Appl. No. 11/509,391.
Office Action issued on Dec. 19, 2012 in U.S. Appl. No. 11/509,391.
Notice of Allowance and Examiner-Initiated Interview Summary issued on Jul. 1, 2013 in U.S. Appl. No. 11/509,391.
Office Action issued on Mar. 30, 2010 in U.S. Appl. No. 11/789,147.
Office Action issued on Feb. 3, 2011 in U.S. Appl. No. 11/789,147.
Notice of Allowance mailed May 26, 2011 in U.S. Appl. No. 11/789,147.
Office Action issued on Mar. 2, 2010 in U.S. Appl. No. 11/844,102.
Notice of Allowance mailed Sep. 16, 2010 in U.S. Appl. No. 11/844,102.
Notice of Allowance mailed Jan. 20, 2011 in U.S. Appl. No. 11/844,102.
Notice of Abandonment under 37 CFR 1.53(f) or (g) mailed Oct. 11, 2011 in U.S. Appl. No. 12/985,923.
Office Action issued on Sep. 8, 2008 in U.S. Appl. No. 11/505,582.
Notice of Allowability issued on Dec. 17, 2008 in U.S. Appl. No. 11/505,582.
Office Action issued on Dec. 15, 2009 in U.S. Appl. No. 12/388,712.
Office Action issued on May 20, 2010 in U.S. Appl. No. 12/388,712.
Notice of Allowance mailed Jul. 1, 2010 in U.S. Appl. No. 12/388,712.
Office Action issued on Nov. 10, 2010 in U.S. Appl. No. 12/658,209.
Office Action issued on Mar. 3, 2011 in U.S. Appl. No. 12/658,209.
Examiner interview summary issued on May 25, 2011 in U.S. Appl. No. 12/658,209.
Office Action issued on Nov. 2, 2011 in U.S. Appl. No. 12/658,209.
Office Action issued on May 10, 2012 in U.S. Appl. No. 12/658,209.
Notice of Abandonment issued on Dec. 17, 2012 in U.S. Appl. No. 12/658,209.
Office Action issued on Dec. 23, 2013 in U.S. Appl. No. 13/668,033.
Office Action issued on Apr. 21, 2014 in U.S. Appl. No. 13/668,033.
Notice of Allowance issued on Aug. 29, 2014 in U.S. Appl. No. 13/668,033.
U.S. Appl. No. 14/156,132, filed Jan. 15, 2014.
Notice of Allowance issued on Nov. 14, 2014 in U.S. Appl. No. 13/947,847.
Office Action issued on Jan. 7, 2015 in U.S. Appl. No. 13/608,852.
"U.S. Appl. No. 13/668,033, Examiner Interview Summary mailed Feb. 4, 2014", 3 pgs.
"U.S. Appl. No. 13/668,033, Response filed Feb. 4, 2014 to Non Final Office Action mailed Dec. 23, 2013", 13 pgs.
"U.S. Appl. No. 13/668,033, Response filed Jul. 21, 2014 to Final Office Action mailed Feb. 21, 2014", 13 pgs.

FILE SYSTEM DIRECTORY ATTRIBUTE CORRECTION

PRIORITY CLAIM

This application is a continuation of U.S. patent application Ser. No. 13/668,033 filed on Nov. 2, 2012, which is incorporated herein by reference in its entirety and claims the benefit of U.S. Provisional Application Ser. No. 61/555,419, filed on Nov. 2, 2011, which is also incorporated herein by reference in its entirety.

BACKGROUND

Common data transformations performed on computer files or other denominations of data often bring about modifications to certain file attributes such as file size, file name, etc. File attribute changes can be related to the goal of the transformation (e.g., successful compression reduces file size) or can be a side-effect (e.g., an encryption algorithm might require rounding of file data sizes up to some boundary). When a data transformation modifies file attributes, it causes a difference between the file's logical attributes (e.g., attributes of the un-transformed file) and its native attributes (e.g., attributes after transformation). In many cases, the attribute meta-data associated with the file will reflect the native attributes rather than the logical attributes. This can cause complications when applications expect to receive a file or its attributes in an un-transformed or logical format. When a single file, or attributes thereof, is requested, the file may be corrected before the file and/or its attributes are returned to the application (e.g., by reverse transformation to logical form). In cases where multiple files are required, returning an untransformed file and/or the untransformed, logical file attributes can be computationally expensive as each file and its attributes must be reverse transformed on-the-fly. Existing technologies either omit attribute correction (which leads to incorrect application behavior) or they suffer from the overhead costs associated with on-the-fly correction.

DRAWINGS

Various embodiments are described herein by way of example in conjunction with the following figures, wherein.

DESCRIPTION

Figure 1:
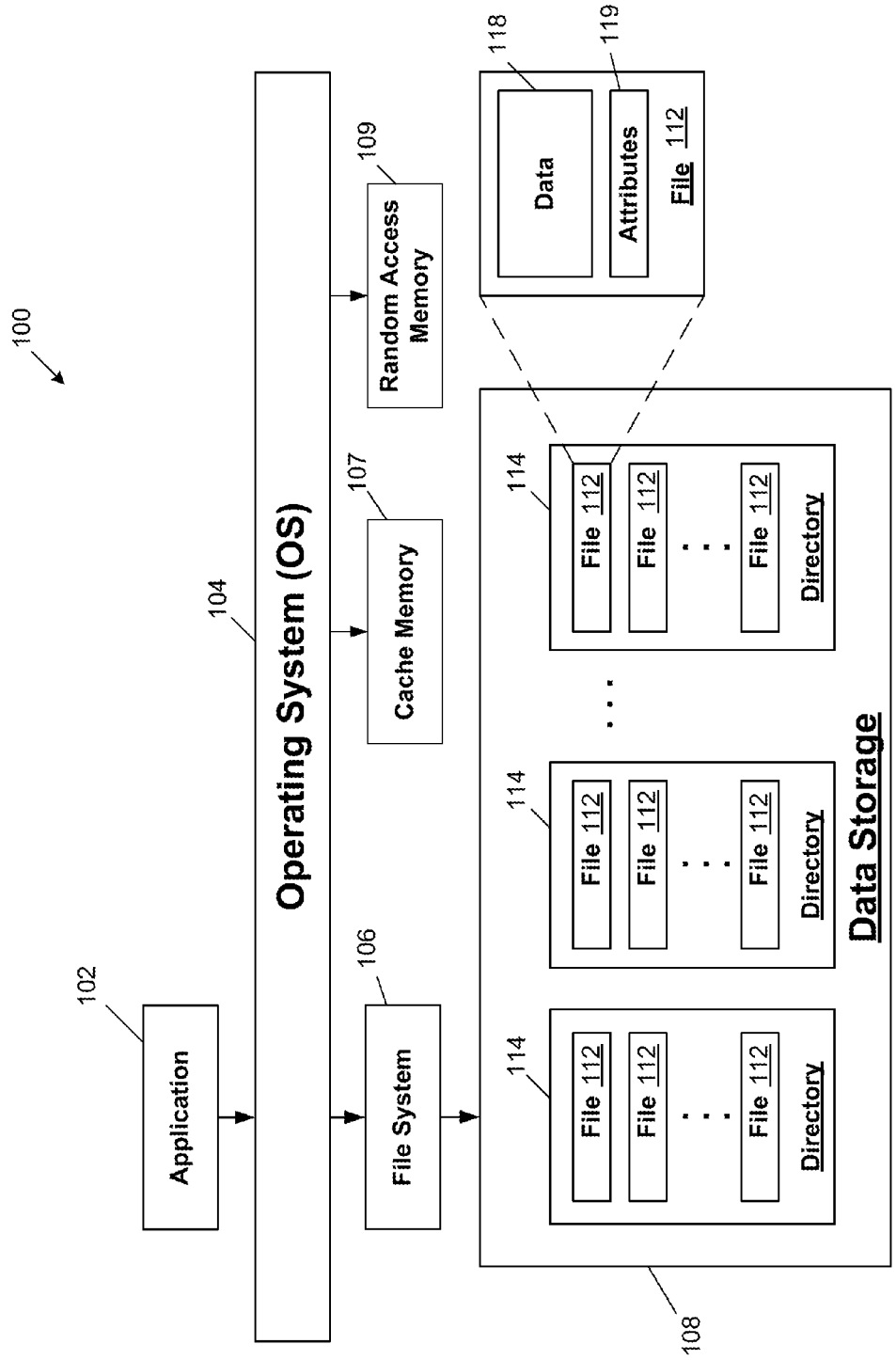
FIG. 1 is a logical block diagram showing one embodiment of a system architecture of a computer system that may implement file system directory attribute correction as described herein.

Various embodiments described herein are directed to systems and methods for utilizing tagging and/or caching to correct file attributes in a computer system. For example, the systems and methods described herein may be utilized to correct the attributes of files that have been subject to a transformation or other operation causing a divergence between the file's native attributes and its logical attributes.

As described herein, performing transformations on file data may cause changes in file attributes (e.g., divergence between native and logical file attributes). For example, implementing encryption may change a file's name, size, timestamps, etc. In many cases where data transformations are performed, it is desirable to return file attributes to their original, logical form before the attributes are returned to a requesting utility or application. For example, when a request for one or more file attributes is received from a utility or other application, an implementing computer system (e.g., an OS, file system, layered component, etc. thereof) may need to examine each file and/or file attribute returned by the underlying OS component (e.g., file system) and then determine what corrections, if any, must be made to the file attribute. Necessary corrections may then be made before the requested attribute or attributes are returned to the requesting application. Determining whether a file's attributes require correction and, if so, performing the correction can be computationally expensive. For example, these operations may require additional processing, additional I/O to the file, communications with external components (e.g., a database) and/or other operations. If performed each time the information is requested, these operations can create a noticeable decrease in system performance. Potential decreases in system performance are only amplified when the implementing system generates a directory enumeration or listing comprising file attributes for all files in a subject directory.

Various embodiments utilize file tagging to improve the efficiency of file attribute correction. For example, files that are known to require attribute correction may be tagged. Upon receiving a request for one or more attributes of a file, an implementing computer system may check whether the corresponding file is tagged. If the file is tagged, the implementing computer system may not need to perform any additional processing to determine whether file correction is necessary. Files may be tagged in any suitable manner. For example, a file may be tagged by modifying the file's existing meta-data to indicate that attribute correction is necessary. Examples of meta-data that may be modified include, file timestamps, file sizes and/or other attributes of the file. The meta-data may be modified in a way so as to make it possible to determine in the future from the meta-data that the file attributes require correction. In some embodiments, when a file attribute is modified to tag the file, the unmodified (e.g., correct) value for the attribute may be stored at an alternate location (e.g., with the file itself, in an external database, etc.). In some embodiments, files may be tagged by adding additional information to the file (e.g., an alternate data stream, etc.). The existence of such additional information may be hidden (e.g., from the OS, application, etc.). For example, when the additional information is an alternate stream, the alternate stream may be removed from replies to application calls requesting the list of streams for the file. In some embodiments, a file may be tagged during the transformation process (e.g., the process causing diversion between native and logical file attributes). For example, as a file is transformed, its meta-data may be tagged in a manner indicating that some file attributes will require correction.

Various embodiments may also improve the efficiency of file attribute correction by utilizing attribute caching. Attribute caching may be utilized in conjunction with or separate from tagging. In various embodiments, the implementing computer system may maintain an attribute cache. The attribute cache may be stored at any suitable location (e.g., system memory, cache memory, persistent storage, combinations thereof, etc.) and may comprise entries for a plurality of files requiring attribute correction. The entry for each file may indicate at least one native (e.g., existing) attribute of the file and at least one logical (e.g., corrected) attribute of the file. When the implementing computer system receives a request for one or more file attributes, it may review the attribute cache. If the file that is the subject of the request (e.g., the subject file) has an attribute cache entry, the implementing computer system may receive the file's logical attribute or attributes from the cache. This may obviate the need for the implementing computer system to derive logical attributes each time that a file (or its attributes) are accessed. In the context of a directory enumeration, the attribute cache may be examined for each file in the directory, either in a batch or via iteration over the full set of entries, or some combination of both.

The attribute cache may be populated in any suitable manner. In some embodiments, the attribute cache is populated as requests for file attributes (e.g., directory enumeration requests) are received. For example, when the implementing system receives an attribute request for a file requiring attribute correction, it may derive the logical attributes and then generate for the file an attribute cache entry indicating the native and logical attributes of the file. Also, in some embodiments, the attribute cache may be pre-populated. For example, files having attributes that are commonly accessed and/or directories that are commonly enumerated may be pre-processed to generate attribute cache entries.

The implementing computer system may be any suitable type of system such as, for example, a computer system utilizing a layered file system or similar arrangement (e.g., a UNIX layered file system, a MICROSOFT WINDOWS isolation file system filter driver, etc.). In some example embodiments, the implementing computer system is used in conjunction with a file system utilizing layered components to perform data transformations (e.g., transformations that cause a divergence between native and logical file attributes). The layered components may be operating system (OS) or non-OS components. Examples of layered components that may perform data transformations include OS components, file system components, additional (third-party) transformation components positioned between the OS and the file system (or at any other suitable logical position), etc.

In various embodiments, the systems and methods described herein may improve the performance of systems in which file attributes must be corrected to represent the correct logical information to applications. While this can be done without tagging and/or caching, there may be a considerable performance cost associated with other methods. Thus, the systems and methods described herein may mitigate the cost of building layered data modification/transformation systems (e.g., encryption and/or compression). For example, tagging files may allow quick determinations of whether files require correction of their meta-data attributes. Also, for example, caching both the native (original) attributes and the logical (corrected) attributes of the file allows quick computation of the correct attributes to report (e.g., it may not be necessary to re-calculate the logical attributes for each file after the cache is populated). It will be appreciated that, in some embodiments, the tagging and caching features may be utilized separately. For example, files may be tagged, as described, to indicate to the implementing computer system that attribute correction is required. Also, for example, the described cache may be implemented without the use of tagging.

Before providing additional description of systems and methods for file system directory attribute correction, brief descriptions are provided of an example computer system for implementing file system director attribute correction. FIG. 1 is a logical block diagram showing one embodiment of a system architecture 100 of a computer system that may be used to implement file system directory attribute correction as described herein. The architecture 100 may be implemented on any suitable type of computer hardware. For example, the architecture 100 may be implemented on a computer device comprising a central processing unit (CPU) or other processor, random access memory, persistent storage (e.g., hard drive, solid state drive (SSD), etc. A block diagram of an example implementing computer system for the architecture 100 is provided and described below with respect to FIG. 8.

The architecture 100 may include one or more examples of an application 102, an operating system 104, a file system 106, cache memory 107, random access memory 109, and a persistent data storage 108. The application 102 indicated at FIG. 1 may be executed by a processor or processors of a computer system implementing the architecture 100. When executed, the application 102 may perform at least one function such as, for example, providing e-mail service, providing word processing, providing financial management services, performing administrative tasks for the computer system, etc. In various example embodiments, the application 102 may be a program provided with the operating system 104 environment. The application 102 may access different system resources (e.g., files 112, directories 114, etc.) by generating access requests. For example, the application 102 may request a directory enumeration or other indication of file attributes. The access requests may be handled by other components of the architecture 100 such as the OS 104, the file system 106, the file system filter driver 110 (FIG. 2), etc. Although FIG. 1 shows a single application 102, the architecture 100 may support an arbitrary number of applications (not shown).

In various embodiments, the application 102 may access various system resources, such as data storage 108, memory 109, etc., via operating system 104. The operating system 104 may be any suitable operating system. For example, in various non-limiting embodiments, the operating system 104 may be any version of MICROSOFT WINDOWS, any UNIX operating system, any Linux operating system, OS/2, any version of MAC OS, etc. The operating system 104 may provide services to the application 102 that facilitate the application's 102 functions. For example, the operating system 104 may allow the application 102 to access and manipulate system resources.

Components of the application 102, data utilized by the application 102 as well as components and or data for other applications (e.g., resources) may be stored at persistent data storage 108. Persistent data storage 108 may include any kind of storage drive capable of storing data in an electronic or other suitable computer-readable format. In certain non-limiting embodiments, data storage 108 may include a single fixed disk drive, an array of disk drives, an array of disk drives combined to provide the appearance of a larger, single disk drive, a solid state drive (SSD), etc. Data storage 108 may be physically located at the implementing computer system and/or accessible over a network. In some embodiments, data storage 108 may comprise more than one physical device located at a single location or across multiple locations. For example, in some embodiments, the data storage 108 may be and/or comprise cloud-based storage.

File system 106 may be an organization system for logically and physically organizing data present at the data storage 108. In various non-limiting embodiments, the file system 106 may be a native file system included with the operating system 104, described below or a third party file system. The file system 106 may organize data units into logical files 112 and directories or folders 114. The file system 106 may also manage associations between data files 112, directories 114 and physical addresses at the data storage 108. The file system 106 may be, for example, specific to a computer system and/or or to particular drives making up data storage 108. In various embodiments, a single file system 106 may manage associations between data files, directories, and physical locations for data storages 108 located across the computer system 100. The file system 106 may be any suitable file system including, as non-limiting examples, File Allocation Table 16 (FAT16), File Allocation Table 32 (FAT32), NTFS, High Performance File System (HPFS), UNIX file system (UFS), XFS, journaled file system (JFS), Universal Data Format File System (UDFS), CD-ROM File System (CDFS), Enhanced File System (EFS), SGI XFS, Clustered XFS (CXFS), HFS, VxFS, Raw File System (RawFS), Local File System (DCE/LFS), etc.

Each of the files 112 may include data 118 and attributes 119. The data 118 may include various data units and may be organized, for example, according to the file system 106. Attributes 119 may comprise meta-data describing the file. The attributes 119 may describe various different file properties including, for example, file names, file sizes and file timestamps, such as timestamps indicating when the file 112 was created, modified, accessed, etc. Other example attributes may indicate file properties such as, for example, access controls (e.g., read-only), flags that describe characteristics of the file (e.g., system, hidden, archive), lists of alternate data streams associated with a file 112, etc. The file attributes 119 may be stored as a part of a file 112, for example, as part of a data stream associated with the file. Also, in some embodiments, file attributes 119 may be stored (e.g., by the file system 106, OS 104, or file system filter driver 110 (FIG. 2)) in a separate location in persistent data storage 108, cache memory 107 and/or random access memory 109.

Figure 2:
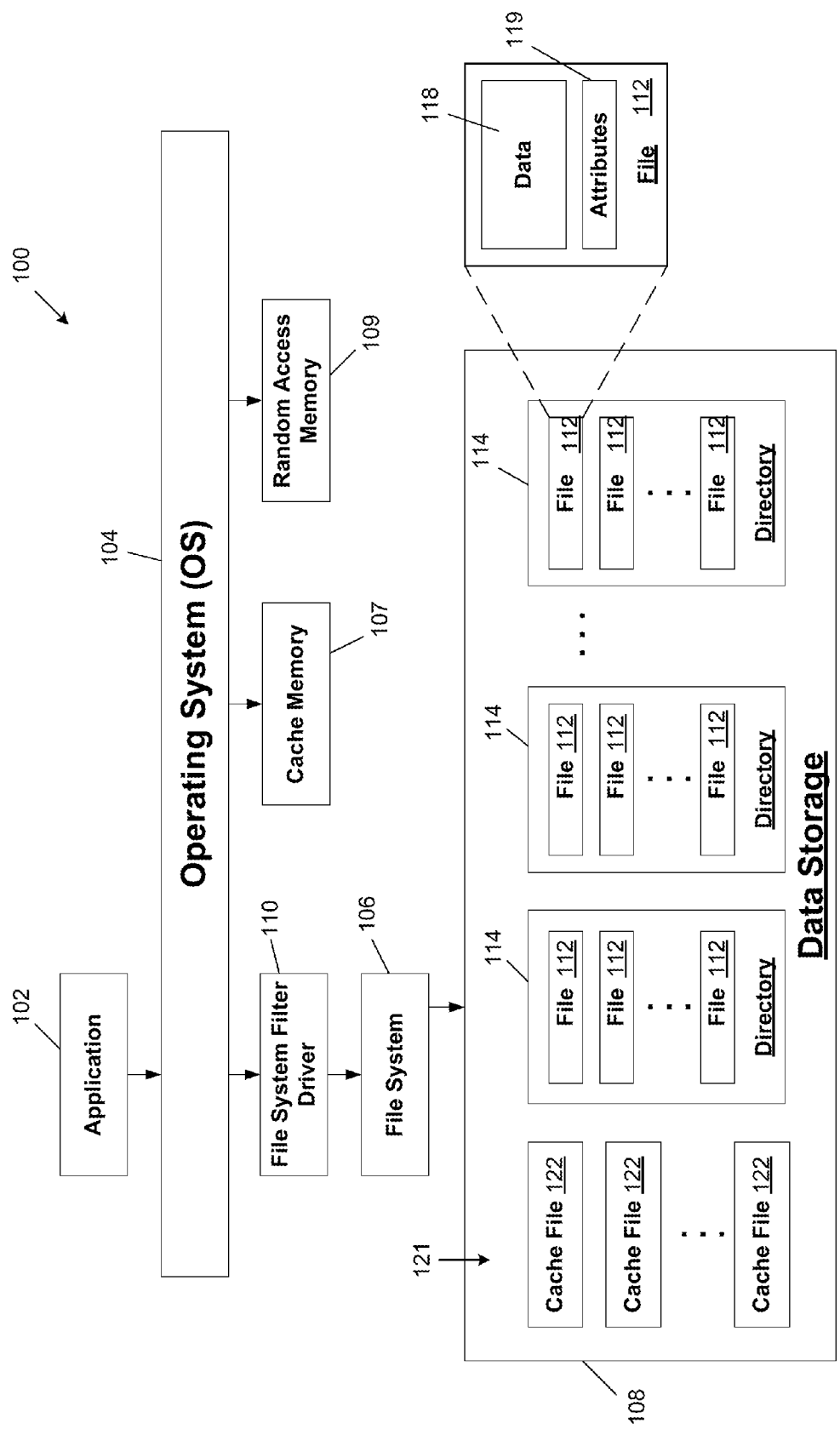
FIG. 2 is a logical block diagram of the system architecture of FIG. 1 further comprising a file system filter driver.

FIG. 2 is a logical block diagram of the system architecture 100 of FIG. 1 further comprising a file system filter driver 110. The file system filter driver 110, or layered component, may be logically positioned between the application 102 and data storage 108. For example, as illustrated in FIG. 2, the file system filter driver 110 is positioned between the operating system 104 and the file system 106. In various embodiments, however, the file system filter driver 110 may be logically positioned between the file system 106 and the data storage 108. The file system filter driver 110 may perform various functions related to file system directory attribute correction, as described herein. In some embodiments, the file system filter driver 110 may be executed by the architecture 100 to implement one or more translations that modify the individual files 112 on the storage 108. Examples of such transformations may include: encryption, compression, using hierarchal storage management to store data in an alternate location, replacing data contents with location information, data deduplication, using content addressing in place of actual data, encrypting the data, compressing the data, streaming content delivery (e.g., sparse files that are filled on demand), some combination of the above, etc. An example of utilizing data transformations is the BITRAIDER system available from BITRAIDER LLC. Also, in various embodiments, data transformations may be performed by the OS 104, the file system 106 or any other suitable component of the architecture 100.

Example systems and methods that may perform data transformations as described herein are provided by commonly owned U.S. patent application Ser. No. 11/145,433 entitled "Systems and Methods for Arbitrary Data Transformations;" U.S. patent application Ser. No. 11/509,391 entitled, "Managing Access to a Resource;" U.S. Pat. No. 8,024,433 entitled "Managing Application Resources," U.S. Pat. No. 7,949,693 entitled, "Log-Structured Host Data Storage," U.S. patent application Ser. No. 12/658,209 entitled, "Methods and Systems for Remote Data Storage Utilizing Content Addresses," and PCT Patent Application Serial No. PCT/US11/20375 entitled, "Network Encryption," all of which are incorporated herein by reference in their entireties.

FIG. 2 also illustrates an attribute cache 121 comprising a plurality of cache files 122. The attribute cache 121 is illustrated in FIG. 1 stored at persistent data storage 108, though it will be appreciated that the attribute cache 121 may be wholly or partially stored at various other locations in the architecture 100 such as, for example, the cache memory 107, random access memory 109, etc. Also, it will be appreciated that attribute cache 121 may also be implemented in architectures such as that shown in FIG. 1 that omit a file system filter driver 110 or other layered component. For example, the attribute cache 121 may be populated and/or utilized by the OS 104, the file system 106, etc. The attribute cache 121 may comprise a single logical file or, as illustrated in FIG. 2, may comprise multiple cache files 122. For example, each of the cache files 122 may correspond to a defined group of files 112, such as a directory 114, a part of a directory 114, multiple directories 114, etc.

Figure 3:
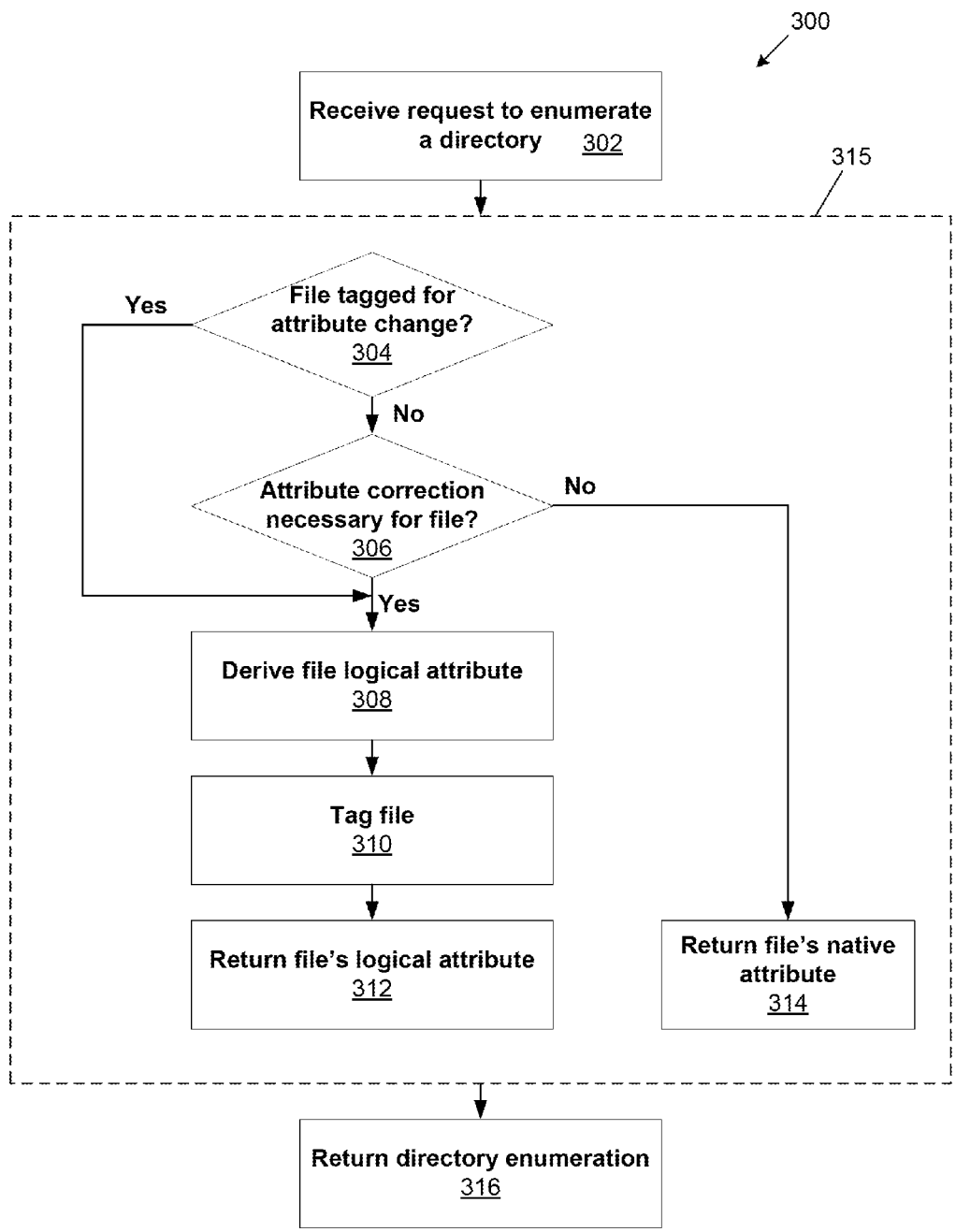
FIG. 3 is a flow chart illustrating one embodiment of a process flow for utilizing tagging to facilitate directory enumeration.

FIG. 3 is a flow chart illustrating one embodiment of a process flow 300 for utilizing tagging to facilitate directory enumeration. The process flow 300 is described herein as being executed by the file system filter driver 110. In various embodiments, however, the process flow 300 may be executed in whole or in part by any component of the architecture 100 including, for example, the operating system 104, the file system 106 and/or the file system filter driver 110. At 302, the file system filter driver 110 may receive a request to enumerate a directory 114. The request may originate from an application executed using the architecture 100, such as the application 102. In various embodiments, the request may be originally directed from the application 102 to the operating system 104. Accordingly, the file system filter driver 110 may receive the request from the operating system 104. In response to the request, the file system filter driver 110 may process the files 112 in the requested directory 114 to generate the enumeration of file attributes. For example, for a first file 112 in the requested directory 114, the file system filter driver 110 may determine, at 304, whether the file 112 is tagged as indicating a need for attribute correction. A file 112 may be tagged, for example, as described herein below, when it has been the subject of a transformation that will or can change its associated attributes 119. In this way, the tag may serve as an indication to the file system filter driver 110 that attribute correction should be performed.

If the file 112 is not tagged, the file system filter driver 110 may determine, at 306, whether the file 112 requires attribute correction. For example, the file system filter driver 110 may determine if a record exists indicating that the file 112 has been transformed (e.g., by the file system filter driver 110, another file system filter driver, the operating system 104, the file system 106, etc.). Also, in some embodiments, the file system filter driver 110 may examine the file 112 for indications that it has been subject to a transformation. If, at 306, the file 112 is determined to not require attribute correction, the file system filter driver 110 may return, at 314, the file's native attributes (e.g., for inclusion in the directory listing). If, at 306, the file 112 is determined to require attribute correction and/or if the file 112 is determined at 304 to be tagged as requiring attribute correction, then the file system filter driver 110 may determine the logical attributes for the file at 308. The logical attributes of the file may be determined in any suitable manner. For example, in embodiments utilizing an attribute cache 121, deriving the logical attributes of a file may comprise consulting an entry for the file 112 at the attribute cache 121. In some embodiments, deriving the logical attributes of a file may comprise performing a reverse transformation of the file 112, thereby re-converting the file 112 to its original form where the file's logical attributes and native attributes are the same.

At 310, the file system filter driver 110 may tag the file 112. Tagging of the file may indicate that the file requires attribute correction and may be performed in any suitable manner. For example, a tag may be added to the meta-data or attributes 119 associated with the file 112. In some embodiments, the file 112 may be tagged by modifying its native size. For example, the file 112 may be modified to have a size divisible by a certain value (e.g., 512 bytes or another value). In addition, in some embodiments, the file 112 may be tagged utilizing an alternate data stream (a feature of some file systems such as NTFS). For example, an indication of the tag may be incorporated into an alternate data stream 112 associated with the file 112. Also, in some embodiments, the file 112 may be tagged by modifying its time stamps. For example, the file 112 may have multiple time stamps indicating, for example, a file creation time, a last access time, a last write time and, in some file systems, a last change time indicating the last change to the file's attributes. The tag may be applied to a file, for example, by modifying one or more of these values in a predictable manner.

In some embodiments, the file 112 may be tagged by modifying its name. For example, the file may be re-named with a universally unique identifier (UUID), globally unique identifier (GUID) or other similar naming standard that makes it straight-forward to determine which files require correction (as only those files meeting the exact size requirements of a GUID would fall into that category.) Other similar standards may include, for example, other algorithmically defined mechanisms for automatically generating a name. Tagging in this manner may have the additional advantage of encrypting the file name.

At 312, the file system filter driver 110 may return the logical attributes of the file 112, as determined at 308, for example, to be utilized in the enumeration of the directory.

In various embodiments, the file system filter driver 110 may perform the actions indicated by box 315 for all files 112 in the requested directory 114. Upon determining the proper attributes for each file 112 in the directory 114, the file system filter driver 110 may return an enumeration for the directory at 114. The enumeration may include a list of files 112 in the directory as well as the logical attributes for the files. In some embodiments, the actions indicated by box 315 may be separately performed for a single file 112 outside the context of a directory enumeration or listing.

Figure 4:
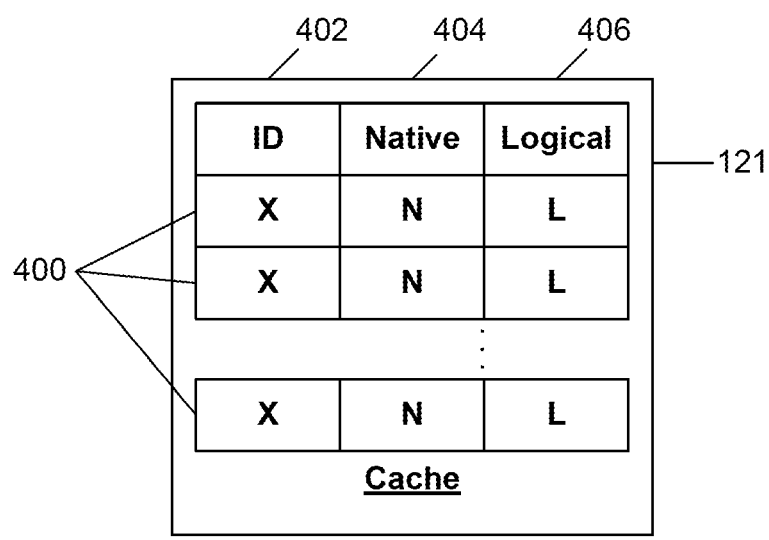
FIG. 4 is a block diagram showing one embodiment of an attribute cache that may be utilized to facilitate directory enumeration.

In various embodiments, the attribute cache 121 may be utilized to facilitate the process of directory enumeration. FIG. 4 is a block diagram showing one embodiment of an attribute cache 121. The attribute cache 121 may be stored at any suitable data storage of the architecture 100 including, for example, at persistent data storage 108 as indicated in FIG. 2 and/or at cache memory 107, random access memory 109, etc., or any suitable combination thereof. The attribute cache 121 may comprise a plurality of entries 400, with each of the entries 400 corresponding to a file 112. Each file entry 400 may comprise an indication of the corresponding file (402) as well as one or more native attributes for the file (404) and one or more logical attributes for the file (406). In some embodiments, the native attributes 404 may serve as the identification of the file 112 and other indications (402) of the corresponding file 112 may be omitted. For example, the native attributes (404) of the corresponding file 112 may comprise the name of the file 112. In various embodiments, the attribute cache 121 may be created in a protected location within the directory hierarchy (e.g., "System Volume Information" on a MICROSOFT WINDOWS system). In various embodiments, the attribute cache 121 may be persistent and may only be deleted, for example, when the size of the cache exceeds a threshold size, which may be predetermined.

In some embodiments, the cache 121 may be logically organized as a series of cache files 122 (FIG. 2) with each cache file 122 comprising entries for one or more files. For example, each cache file 122 may correspond to one or more directories 114 and may include entries for files 112 in its corresponding directory or directories. In various embodiments, separate cache files 122 may be created for each directory 114. For example, cache files 122 may be associated with the relevant directory 114 using unique information (e.g., the GUID assigned to the directory) to construct the name of the cache file 122.

The attribute cache 121 may be organized and/or managed in any suitable manner. For example, in some embodiments, a database technique may be used for organizing and managing the persistent cache file. This may provide efficiency of size, which can prove to be a critical issue for directories containing large numbers (e.g., millions) of entries. Also, database techniques may scale well. Examples database techniques that may be used, as described herein, to organize and manage a cache file are provided in "Comp 231 Database Management Systems," by Wilfred Ng, which is incorporated herein by reference.

Figure 5:
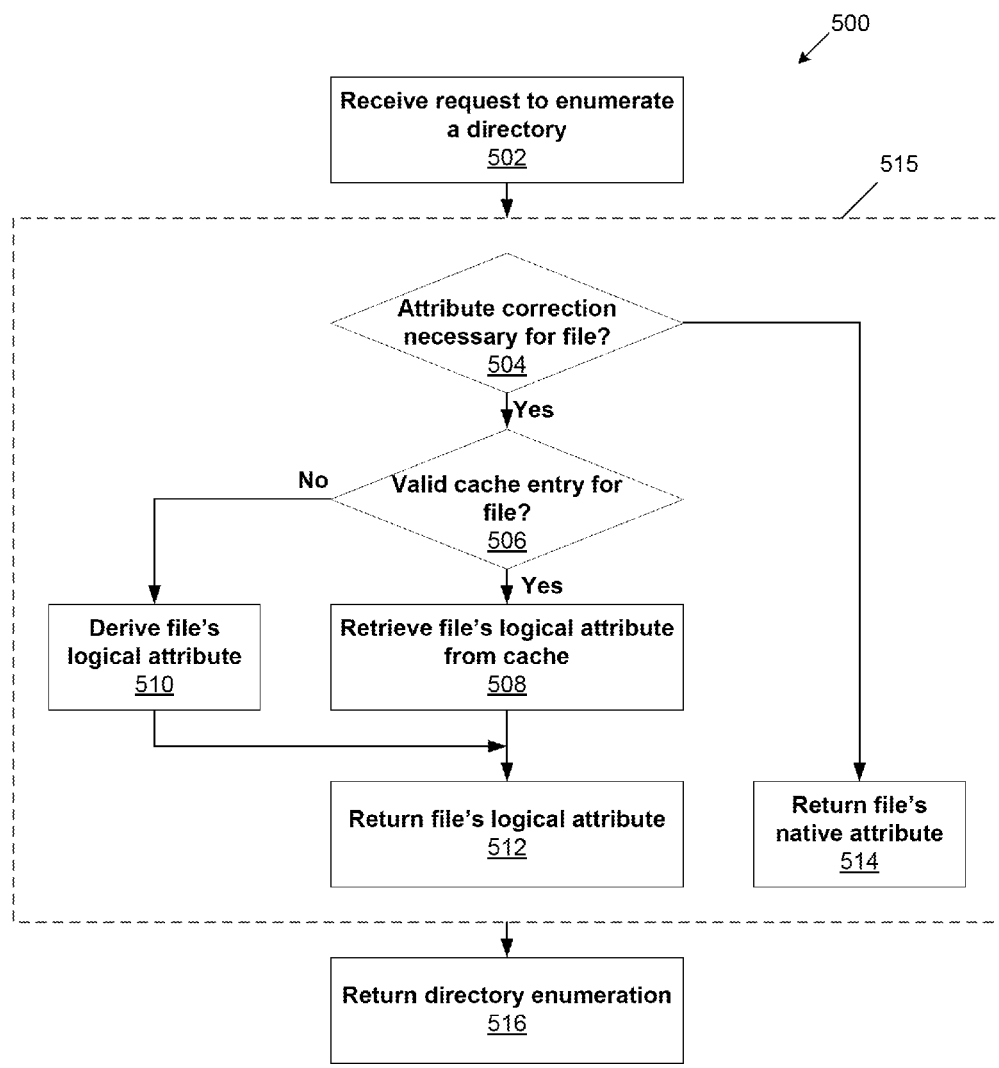
FIG. 5 is a flow chart illustrating one embodiment of a process flow for utilizing caching to facilitate directory enumeration.

FIG. 5 is a flow chart illustrating one embodiment of a process flow 500 for utilizing caching (e.g., cache files 122) to facilitate directory enumeration. Like the process flow 300, the process flow 500 is described as being executed by the file system filter driver 110. It will be appreciated, however, that the process flow 500 may be executed by any suitable component of the architecture 100 including, for example, the operating system 104, the file system 106, etc. At 502, the file system filter driver 110 may receive a request to enumerate a directory 114. The request may originate from an application executed using the architecture 100, such as the application 102. At 504, the file system filter driver 110 may determine whether attribute correction is required for a file 112 in the directory 114. Determining whether attribute correction is necessary may be determined in any suitable manner, for example, as described above with respect to 306. If no attribute correction is required, then the file system filter driver 110 may, at 514, return the file's native attributes for use in the enumeration.

At 506, the file system filter driver 110 may determine whether there is a valid cache entry for the file 112. For example, the file system filter driver 110 may determine whether there is an entry for the file 112 at the attribute cache 121. This may involve, for example, determining a cache file 122 corresponding to the file 112 and/or a directory 114 including the file 112 and examining the cache file 122 for an entry corresponding to the file 112. If no valid entry is found at 506, the file system filter driver 110 may derive the file's logical attributes at 510. The logical attributes may be derived, for example, as described herein above with respect to 308. In various embodiments, no valid cache entry may be found for the file 112 at 506 if there is no entry for the file 112 at all, or if an entry associated with the file exists, but is invalid. For example, if the file system filter driver 110 finds a cache entry associated with the file 112, it may determine if the native attributes associated with the file 112 match the native attributes indicated for the file 112 at the cache entry. If the native attributes match, then the file system filter driver 110 may determine that there is a valid cache entry for the file 112. If not, then the cache entry associated with the file 112 may be deemed stale and discarded from the attribute cache 121. If no valid entry is found for the file 112 (e.g., either there is no corresponding entry, or the corresponding entry is stale), then the file system filter driver 110 may derive the file's logical attributes at 510. The action 510 may be executed, for example, in a manner similar to that described above with respect to 308. In some embodiments, actions 504 and 506 may be combined, with the presence or absence of a cache entry serving as a tag. For example, if a cache entry is present for a file 112, the file system filter driver 110 may determine that attribute correction is required. If no cache entry is present, the file system filter driver 110 may determine that no attribute correction is required and may return the file's native attributes at 514. Utilizing the attribute cache 121 as described herein may be particularly advantageous in cases where the file attribute requiring correction is the file's name. Correcting a file's name may be generally an expensive step, involving performing I/O to the file and/or an external repository of some sort (e.g., a database.) Avoiding such I/O (e.g., by caching the correct logical name) may, thereby, considerably increase efficiency.

If there is a valid cache entry for the file 112, then the file system filter driver 110 may retrieve the file's logical attributes from the cache entry at 508. At 512, the file's logical attributes may be returned, for example, to be used as part of the directory listing. In various embodiments, the file system filter driver 110 may perform the actions indicated by box 515 for all files 112 in the requested directory 114. Upon determining the proper attributes for each file 112 in the directory 114, the file system filter driver 110 may, at 516, return an enumeration for the directory at 114. The enumeration may include a list of files 112 in the directory as well as the logical attributes for the files. In some embodiments, the actions indicated by box 515 may be separately performed for a single file 112 outside the context of a directory enumeration or listing.

Figure 6:
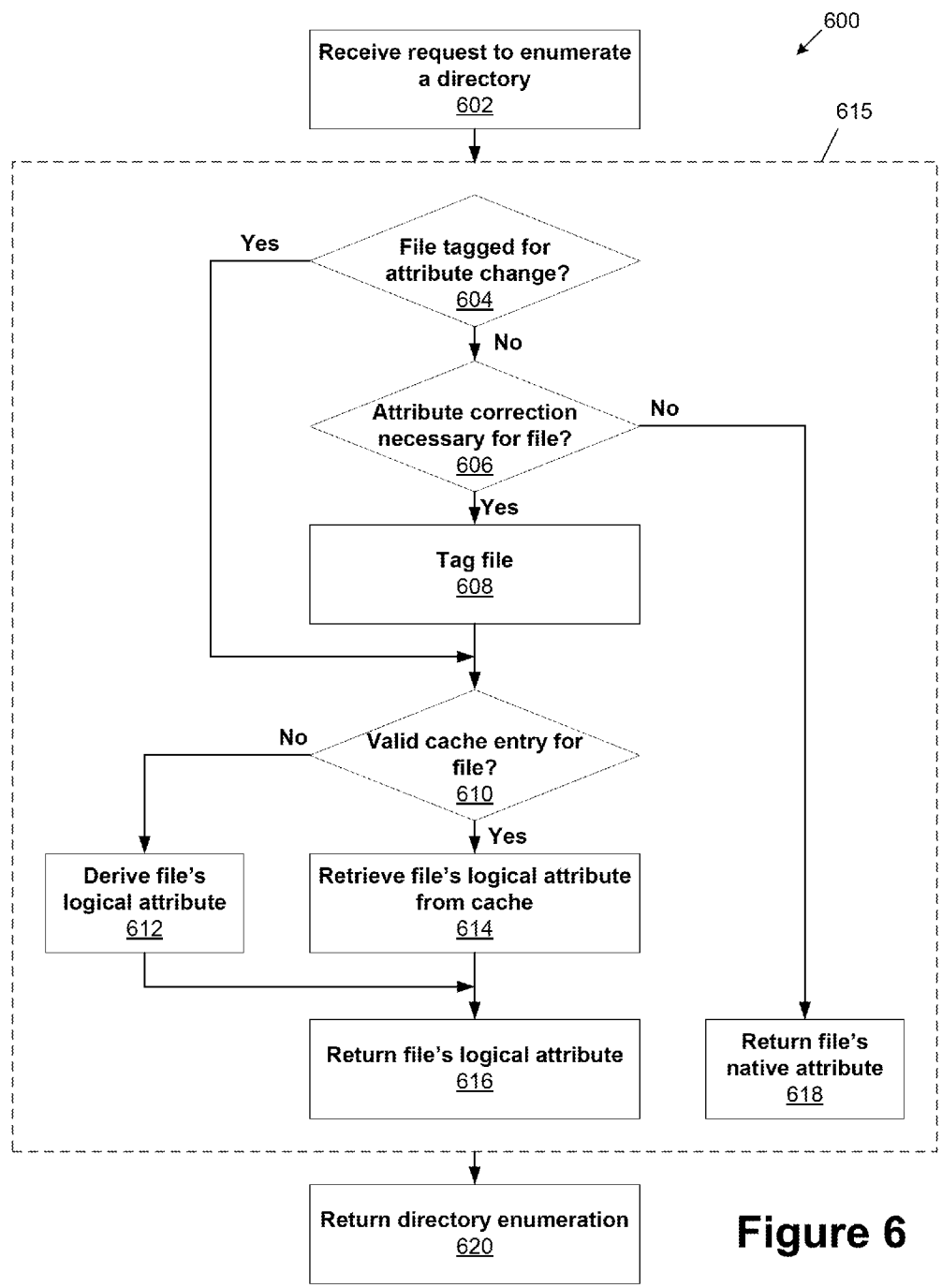
FIG. 6 is a flow chart illustrating one embodiment of a process flow for utilizing tagging and caching to facilitate directory enumeration.

In some embodiments, tagging and caching may be utilized together. For example, FIG. 6 is a flow chart illustrating one embodiment of a process flow 600 for utilizing tagging and caching to facilitate directory enumeration. Like the process flows 300, 500 the process flow 600 is described as being executed by the file system filter driver 110. It will be appreciated, however, that the process flow 600 may be executed by any suitable component of the architecture 100 including, for example, the operating system 104, the file system 106, etc. At 602, the file system filter driver 110 may receive a request to enumerate a directory. The request may originate from an application executed using the architecture 100, such as the application 102. At 604, the file system filter driver may determine whether a file 112 in the directory 114 is tagged to indicate that an attribute change is required, for example, similar to 304 above. If the file 112 is tagged, then the file system filter driver may 110 determine whether there is a valid cache entry for the file 112 at 610. If the file 112 is not tagged, then the file system filter driver 110 may determine, at 606, whether attribute correction is necessary for the file 112, for example, as described with respect to 306 and 504. If attribute correction is necessary for the file 112, then the file system filter driver 110 may tag the file at 608. If attribute correction is not required at 606, then the file system filter driver 110 may return the file's native attributes at 618, e.g., for inclusion in the directory enumeration.

After tagging at 608 and/or after determining that the file 112 is already tagged at 604, the file system filter driver may determine at 610 whether there is a valid cache entry for the file 112, for example, as described herein with respect to 506. If there is no valid cache entry for the file, the file system filter driver 110 may derive the file's logical attributes at 612, for example, as described herein above with respect to 308 and 510. If a valid cache entry exists for the file 112, then the file system filter driver 110 may retrieve the file's logical attributes from cache, such as a cache file 122, as described with respect to 508. At 616, the file system filter driver 110 may return the file's logical attributes, e.g., for inclusion in the directory enumeration. In various embodiments, the file system filter driver 110 may perform the actions indicated by box 615 for all files 112 in the requested directory 114. Upon determining the proper attributes for each file 112 in the directory 114, the file system filter driver 110 may, at 620, return an enumeration for the directory at 114. The enumeration may include a list of files 112 in the directory as well as the logical attributes for the files. In some embodiments, the actions indicated by box 615 may be separately performed for a single file 112 outside the context of a directory enumeration or listing.

In embodiments that utilize caching, the attribute cache 121 (e.g., one or more cache files 122) may be generated and/or updated in any suitable manner. In some embodiments, the attribute cache 121 may be generated during the directory enumeration process. For example, referring to FIG. 5, in some embodiments, upon deriving a file's logical attributes at 510 or 612, the file system filter driver 110 or other suitable component may add an entry for the file 112 to the appropriate cache location. The appropriate cache location, for example, may be a cache file 122 associated with the file 112 or its directory.

Figure 7:
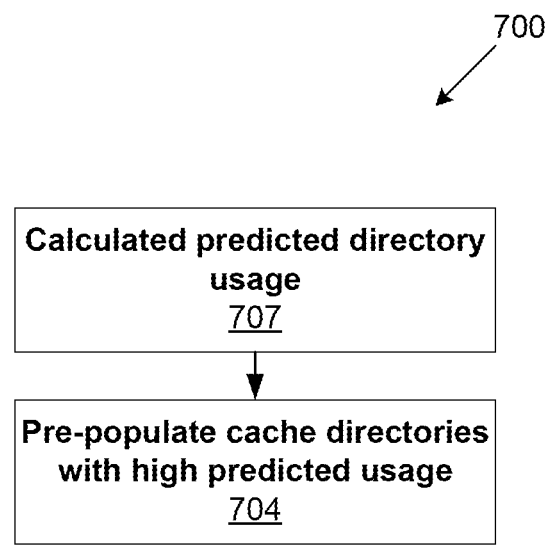
FIG. 7 is a flow chart showing one embodiment of a process flow for pre-populating the attribute cache.

In some embodiments, the file system filter driver 110 or other suitable component, may pre-populate all or a portion of the attribute cache 121 (e.g., before a request for file attributes is received, such as a directory enumeration request). The attribute cache 121 may be pre-populated in any suitable manner. For example, FIG. 7 is a flow chart showing one embodiment of a process flow 700 for pre-populating the attribute cache 121. Once again, the process flow 700 is described as being executed by the file system filter driver 110, although it will be appreciated that any suitable architecture component may perform some or all of the process flow 700 (e.g., the OS 104, the file system 106, etc.).

At 702, the file system filter driver may predict the usage frequency of various files and/or directories. Frequently used files and/or frequently enumerated directories may be determined in any suitable manner. For example, frequently used files and/or frequently enumerated directories may be determined based on past behavior of the user, other similarly situated users, the application(s) executed by the computer system, etc. At 704, the file system filter driver 110 may pre-populate the attribute cache 121 for files and/or directories that are determined to be frequently used. For example, the file system filter driver 110 may examine each individual file 112 to determine if attribute correction is necessary. If attribute correction is necessary for a file, then the file system filter driver 110 may create for the file an entry in the attribute cache 121. In various embodiments, pre-population of the attribute cache 121 may be scheduled to occur when system resources such as the processor and memory are otherwise idle, thus minimizing the performance impact of the initial computation of the corrections. The pre-populated cache 121 may be utilized, for example, as described above with respect to the process flows 500 and 600.

In various embodiments, the file system filter driver 110 or other suitable component of the architecture 100 may be programmed to manage the attribute cache 121. For example, the file system filter driver 110 may discard portions of the attribute cache 121 as needed (e.g., for space management). For example, the attribute cache 121 may not be necessary to enable correct functioning of directory enumeration, but may instead speed the enumeration as to mitigate the cost of computing the corrected information. In some embodiments, the file system filter driver 110 may be programmed to perform various compression techniques to the attribute cache 121. For example, when the attribute cache 121 comprises entries for files that do not require attribute correction, these entries may be compacted. Also, for example, the file system filter driver 110 may be programmed to reclaim space from the attribute cache 121 according to a variety of entry parameters (age, size, available space in memory 109 and/or on persistent storage 108, etc.). Also, in some embodiments, cache entries may be reclaimed when such entries are invalided, for example, upon the deletion or renaming of a file.

Figure 8:
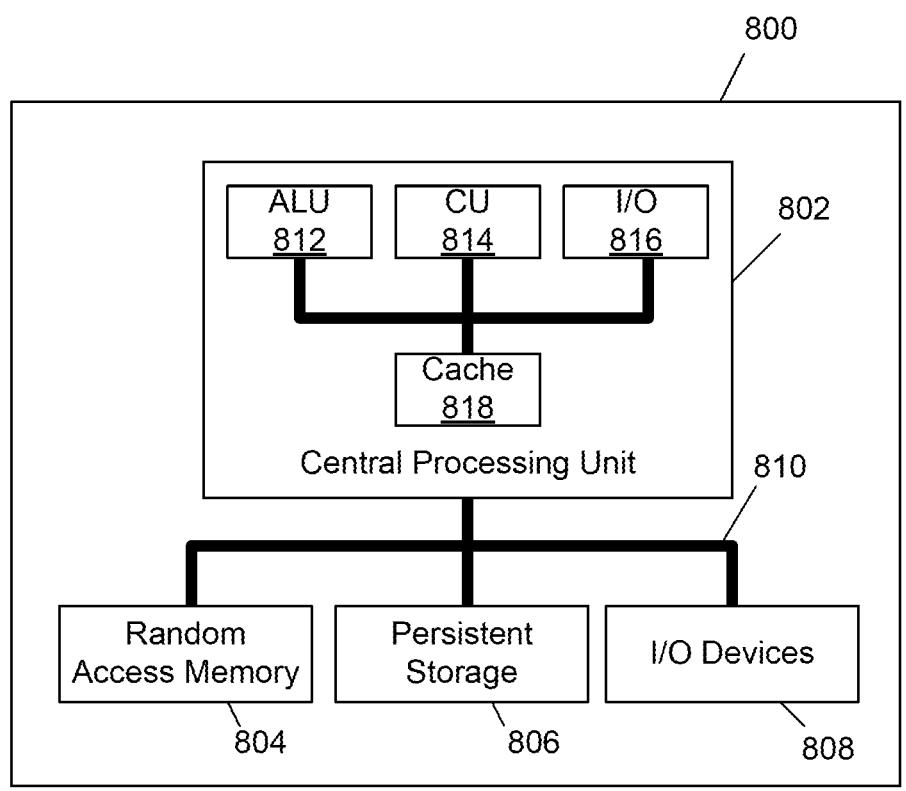
FIG. 8 is a block diagram showing one embodiment of an implementing computer system.

FIG. 8 is a block diagram showing one embodiment of an implementing computer system 800. For example, the computer system 800 is one example of a computer system that may implement the architecture 100 and/or execute the process flows 300, 500, 600 described herein. The computer system 800 comprises a central processing unit (CPU) 802, a random access memory 806, and various input/output (I/O) devices 808. The various components 804, 806, 808 may be in communication with one another via one or more busses such as bus 810.

The CPU 802 may comprise an arithmetic and logic unit (ALU) 812, a control unit 814, cache memory 818, and an input and output I/O control 816. These components can be interconnected by a bus or busses 820, often comprising groups of wires or cables. The control unit 814, ALU 812 and basic I/O control (and sometimes other hardware closely linked with these sections) can be collectively considered the central processing unit (CPU) 802 for the computer system 800. The CPU 802 may be constructed on a single integrated circuit or microprocessor.

The control unit 814 (control system or central controller) may direct the various components of the computer system 800. For example, the control unit 814 may decode each instruction in a computer program and turn it into a series of control signals that operate other components of the computer system 800. To enhance performance or efficiency of operation, the control unit may, in some embodiments, alter the order of instructions. In some embodiments, the control unit 814 may comprise a program counter and a memory register that tracks the location in memory from which the next instruction is to be read.

The ALU 812 may be capable of performing arithmetic and logic operations. The set of arithmetic operations that a particular ALU 812 supports may be limited to adding and subtracting or might include multiplying or dividing, trigonometry functions (sine, cosine, etc.) and square roots. Some embodiments of the ALU 812 may be programmed to operate on whole numbers (integers), while others may use floating point representations of real numbers, for example. The ALU 812 may also compare numbers and return Boolean truth values (e.g., true or false). Some embodiments of the system 800, such as those implementing superscalar computers, may contain multiple ALUs 812 to facilitate processing multiple instructions at the same time. For example, graphics processors and computers with Simple Instruction Multiple Data (SIMD) and/or Multiple Instruction Multiple Data (MIMD) features often possess ALU's 812 that can perform arithmetic operations on vectors and matrices. Some embodiments of the computer system 800 may include one or more RAM cache memories 818 configured to move more frequently needed data into the cache automatically.

Some embodiments described herein may comprise multiple CPU's 802. For example, functions may be divided between separate CPU's 802, creating a multiprocessing configuration. For example, multiprocessor and multi-core (multiple CPUs on a single integrated circuit) computer systems with co-processing capabilities may be employed. Also, multitasking may be employed as a computer processing technique to handle simultaneous execution of multiple computer programs.

Random access memory 804 may comprise any suitable type of memory including, for example, Dynamic Random Access Memory (DRAM), Double Data Rate Synchronous Dynamic Random Access Memory (DDR SDRAM). Persistent storage 806 may be similar to the persistent storage 108 described above with respect to the architecture 100. For example, persistent storage may comprise any type of persistent storage device including, for example, a single fixed disk drive, an array of disk drives, an array of disk drives combined to provide the appearance of a larger, single disk drive, a solid state drive (SSD), etc. I/O devices 808 may, for example, be managed by the I/O control 816 and may include, for example, keyboards, mice, screen displays, monitors, printers, hard disk drives, floppy disk drives, joysticks, and image scanners.

In some embodiments, the architecture 100 may utilizing a file system 106, such as NTFS, that supports streaming and may utilize streaming to facilitate the correction of file attributes. For example, logical file attributes may be stored at a designated stream of a file 112 at the time of transformation. For example, a primary data stream may be used as a "dummy" and may indicate for each transformed file logical information such as file size, etc. Actual data, including native attributes, may be stored in one or more secondary streams. When the OS 104, file system 106 or other architecture component accesses attributes for the transformed file 112, the returned attributes may be the logical attributes from the dummy stream rather than the native attributes. Also, in some embodiments, logical attributes may be stored in a secondary stream. The OS 104, file system 106, file system filter driver 110 or other component of the architecture 100 may use the presence of the secondary stream as a tag indicating that attribute correction is necessary. Logical attributes for the file 112 may then be retrieved from the secondary stream.

Also incorporated herein by reference in their entireties are U.S. Pat. No. 7,809,897 entitled, "Managing Lock Rankings" and U.S. Pat. No. 7,512,748 also entitled, "Managing Lock Rankings."

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention. In certain embodiments, a "module" may include software, firmware, hardware, or any reasonable combination thereof.

Various embodiments of the systems and methods may include and/or utilize a computer or computer system. In various embodiments, a computer may be in communication with a server or server system utilizing any suitable type of communication including, for example, wired or wireless digital communications. In some embodiments, the server or server system may be implemented as a cloud computing application and/or in a similar manner and may provide various functionality of the systems and methods as SaaS.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention.

It is to be understood that the figures and descriptions of the present invention have been simplified to illustrate elements that are relevant for a clear understanding of the present invention, while eliminating, for purposes of clarity, other elements. Those of ordinary skill in the art may recognize, however, that these sorts of focused discussions would not facilitate a better understanding of the present invention, and therefore, a more detailed description of such elements is not provided herein.

Any element expressed herein as a means for performing a specified function is intended to encompass any way of performing that function including, for example, a combination of elements that performs that function. Furthermore the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein.

Moreover, the processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "component," "computer device," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "host," "engine," "loader," "filter," "platform," or "component" may include various computers or computer systems, or may include a reasonable combination of software, firmware, and/or hardware.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it may be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET, SQL, MySQL, or HTML using, for example, conventional or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. As the systems and methods described herein aim to minimize I/O transactions, they may be useful in situations, such as cloud computing configurations, where I/O transactions are performed over a WAN or other network with long I/O delays. The network may use routers and/or public communication links One type of data communication network may cover a relatively broad geographic area (e.g., city-to-city or country-to-country) which uses transmission facilities provided by common carriers, such as telephone service providers. In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods, systems, and tools described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier or other data location information as described herein). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java). Also, application servers may be provided in accordance with the .NET framework, including the Windows Communication Foundation, .NET Remoting, ADO.NET, and ASP.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

In various embodiments, the computer systems, data storage media, or modules described herein may be configured and/or programmed to include one or more of the above-described electronic, computer-based elements and components, or computer architecture. In addition, these elements and components may be particularly configured to execute the various rules, algorithms, programs, processes, and method steps described herein.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

While various embodiments have been described herein, it should be apparent, however, that various modifications, alterations and adaptations to those embodiments may occur to persons skilled in the art with the attainment of some or all of the advantages of the invention. The disclosed embodiments are therefore intended to include all such modifications, alterations and adaptations without departing from the scope and spirit of the invention.

We claim:

1. A computer-implemented method for enumerating a directory, the method comprising:
   transforming, by a computer system component, a first file in a manner that modifies a file attribute of the first file, wherein the computer system component is executed by a computer system comprising at least one processor and data storage, and wherein the computer system component is logically positioned below an operating system of the computer system;
   receiving, by the computer system component, a request to enumerate a directory stored on the data storage, wherein the request is received from the operating system and wherein the directory comprises a plurality of files comprising the first file;
   determining, by the computer system component, that the first file has a corresponding first entry in an attribute cache;
   determining, by the computer system component, that the first entry indicates a first file native attribute and a first file logical attribute, wherein the first file native attribute describes the first file after it is transformed and the first file logical attribute describes the first file before it was transformed;
   determining, by the computer system component, that a second file selected from the plurality of files does not have a corresponding entry in the attribute cache;
   determining, by the computer system component, that a second file native attribute does not match a second file logical attribute;
   deriving, by the computer system component, a derived second file logical attribute;
   generating, by the computer system component, a second entry in the attribute cache for the second file, wherein the second entry indicates the second file native attribute and the derived second file logical attribute; and
   returning, by the computer system component, a response to the request to enumerate the directory, wherein the response comprises the first file logical attribute and the derived second file logical attribute.

2. The method of claim 1, further comprising tagging, by the computer system component, the second file to indicate that the second file native attribute does not match the second file logical attribute.

3. The method of claim 2, wherein tagging the second file comprises at least one action selected from the group consisting of:
   renaming the second file with an algorithmically-determined name;
   renaming the second file with an encrypted version of an original name of the second file;
   modifying a native size of the second file;
   adding an alternate data stream to the second file; and
   modifying at least one time stamp of the second file.

4. The method of claim 1, further comprising;
   determining, by the computer system component, that a third file selected from the plurality of files does not have a corresponding entry in the attribute cache;
   determining, by the computer system component, that the third file is tagged to indicate that a third file native attribute does not match a third file logical attribute;

deriving, by the computer system component, a derived third file logical attribute for the third file;
generating, by the computer system component, a third entry in the attribute cache corresponding to the third file, wherein the third entry indicates the third file native attribute and the derived third file logical attribute; and
return for the third file at least the derived third file logical attribute.

5. The method of claim 1, further comprising the computer system component pre-populating the attribute cache for the directory with entries for the plurality of files.

6. The method of claim 1, wherein the first file native attribute is selected from the group consisting of:
a file name, a file size, and a file timestamp.

7. The method of claim 1, further comprising:
determining, by the computer system component, that a third file selected from the plurality of files has a corresponding third entry in the attribute cache;
determining, by the computer system component, that at third file native attribute indicated by the third entry does not match a third file logical attribute;
removing, by the computer system component, the third entry from the attribute cache;
deriving, by the computer system component, a derived third file logical attribute; and
writing, by the computer system component, a new third entry in the attribute cache corresponding to the third file, wherein the new third entry indicates the derived third file logical attribute.

8. The method of claim 1, further comprising:
generating, by the computer system component, a predicted usage frequency for each of the plurality of files; and
for each of the plurality of files that has a predicted usage frequency above a threshold, generating for the file a corresponding entry in the attribute cache.

9. A computer-implemented system comprising:
at least one processor and an operatively associated data storage, wherein the at least one processor is programmed to:
execute an operating system; and
execute a computer system component, wherein the computer system component is logically positioned below the operating system, and wherein the computer system component is configured to:
transform a first file in a manner that modifies an attribute of the first file;
receive a request to enumerate a directory stored on the data storage, wherein the request is received from the operating system and wherein the directory comprises a plurality of files comprising the first file;
determine that the first file has a corresponding first entry in an attribute cache;
determine that the first entry indicates a first file native attribute and a first file logical attribute, wherein the first file native attribute describes the first file after it is transformed and the first file logical attribute describes the first file before it was transformed;
determine that a second file selected from the plurality of files does not have a corresponding entry in the attribute cache;
determine that a second file native attribute does not match a second file logical attribute;
derive a derived second file logical attribute;
generate a second entry in the attribute cache for the second file, wherein the second entry indicates the second file native attribute and the derived second file logical attribute; and
return a response to the request to enumerate the directory, wherein the response comprises the first file logical attribute and the derived second file logical attribute.

10. The system of claim 9, wherein the attribute cache is at least partially stored at a memory device of the computer-implemented system.

11. The system of claim 9, wherein the attribute cache is at least partially stored at a persistent storage device of the data storage.

12. The system of claim 9, wherein the attribute cache comprises a plurality of attribute cache files.

13. The system of claim 12, wherein each of the plurality of attribute cache files comprises entries for files in the directory only.

14. The system of claim 9, wherein the computer system component comprises a file system filter driver.

15. A computer-implemented method for enumerating a directory, the method comprising:
transforming, by a computer system component, a first file in a manner that modifies an attribute of the first file, wherein the computer system component is executed by a computer system comprising at least one processor and data storage, and wherein the computer system component is logically positioned below an operating system of the computer system;
receiving, by the computer system component, a request to enumerate the directory at the data storage, wherein the directory comprises a plurality of files comprising the first file, and wherein the request is received from the operating system;
determining, by the computer system component, that the first file is tagged to indicate that a first file native attribute does not match a first file logical attribute, wherein the first file logical attribute describes the first file before it was transformed and the first file native attribute describes the first file after it was transformed;
deriving, by the computer system component, a derived first file logical attribute;
determining, by the computer system component, that a second file selected from the plurality of files does not have a corresponding entry in an attribute cache;
determining, by the computer system component, that a second file native attribute does not match a second file logical attribute;
deriving, by the computer system component, a derived second file logical attribute;
generating, by the computer system component, an entry in the attribute cache corresponding to the second file and the derived second file logical attribute; and
returning, by the computer system component, a response to the request, wherein the response comprises the derived first file logical attribute and the derived second file logical attribute.

16. The method of claim 15, further comprising the computer system component tagging the second file.

17. The method of claim 16, wherein tagging the second file comprises modifying a native size of the second file.

18. The method of claim 17, wherein after the modifying the native size of the second file is divisible by a predetermined value.

19. The method of claim 16, wherein tagging the second file comprises adding an alternate data stream to the second file.

20. The method of claim 15, wherein deriving the at least one first file logical attribute comprises:
- determining that the first file has a corresponding first entry in an attribute cache;
- determining that the first entry for the first file indicates native file attributes that match the first file; and
- retrieving from the first entry the derived first file logical attribute.

21. The method of claim 15, wherein deriving the at least one first file logical attribute further comprises performing at least one transformation on the first file.

22. A computer-implemented method for enumerating a directory, the method comprising:
- transforming, by a computer system component, a first file in a manner that modifies an attribute of the first file, wherein the computer system component is executed by a computer system comprising at least one processor and data storage, and wherein the computer system component is logically positioned below an operating system of the computer system;
- receiving, by the computer system component, a request to enumerate the directory at the data storage, wherein the directory comprises a plurality of files comprising the first file, and wherein the request is received from the operating system;
- determining, by the computer system component, that the first file is tagged to indicate that a first file native attribute does not match a first file logical attribute, wherein the first file logical attribute describes the first file before it was transformed and the first file native attribute describes the first file after it was transformed;
- deriving, by the computer system component, a derived first file logical attribute;
- determining, by the computer system component, that a second file native attribute for a second file selected from the plurality of files does not match a second file logical attribute;
- deriving, by the computer system component, a derived second file logical attribute; and
- returning, by the computer system component, a response to the request, wherein the response comprises the derived first file logical attribute and the derived second file logical attribute.

* * * * *